(12) United States Patent
Lindenau et al.

(10) Patent No.: US 8,469,727 B2
(45) Date of Patent: Jun. 25, 2013

(54) ARRANGEMENT FOR CONNECTING TWO SUCCESSIVE CONTACT LINE RAILS

(75) Inventors: Thomas Lindenau, Haltern am See (DE); Wolfgang Krebs, Wetter (DE); Klaus-Dieter Oemus, Hemer (DE)

(73) Assignee: Demag Cranes & Components GmbH, Wetter (DE)

( * ) Notice: Subject to any disclaimer, the term of this patent is extended or adjusted under 35 U.S.C. 154(b) by 0 days.

(21) Appl. No.: 13/384,506

(22) PCT Filed: Jul. 16, 2010

(86) PCT No.: PCT/EP2010/060309
§ 371 (c)(1),
(2), (4) Date: Jan. 17, 2012

(87) PCT Pub. No.: WO2011/012466
PCT Pub. Date: Feb. 3, 2011

(65) Prior Publication Data
US 2012/0115341 A1   May 10, 2012

(30) Foreign Application Priority Data

Jul. 25, 2009 (DE) .......................... 10 2009 034 792

(51) Int. Cl.
*H01R 25/00* (2006.01)
(52) U.S. Cl.
USPC .............. 439/115; 439/110; 439/121; 174/98
(58) Field of Classification Search
USPC ................. 439/110, 115, 116, 121, 210, 212, 439/213; 174/96, 98, 99 R, 70 B, 72 B, 88 B, 174/99 B
See application file for complete search history.

(56) References Cited

U.S. PATENT DOCUMENTS 2,835,752 A   5/1958   Anjeskey et al.
2,961,499 A   11/1960  Mageoch
(Continued)

FOREIGN PATENT DOCUMENTS

DE   19807792 A1   9/1999
DE   10227079 A1   2/2003
JP   55112416 U    8/1980

OTHER PUBLICATIONS

International Search Report and Written Opinion of the International Search Authority from corresponding Patent Cooperation Treaty (PCT) Application No. PCT/EP2010/060309, mailed Sep. 23, 2010.
(Continued)

*Primary Examiner* — James Harvey
(74) *Attorney, Agent, or Firm* — Gardner, Linn, Burkhart & Flory, LLP

(57) ABSTRACT

An arrangement is provided for connecting two successive contact line rails, each made of a longitudinal plastic profile and of at least one contact rail extending along the contact line rails. A contact rail connector is connected to the opposing ends of the contact rails of two successive contact line rails, electrically and mechanically connecting the contact rail ends of the contact rails, and having cover elements attached at the opposing rail ends of the contact line rails of two successive contact line rails, covering the contact rail connectors and displaceable relative to an intermediate element. In order to provide an arrangement for attaching two successive contact line rails that is simple to produce and allows uncomplicated assembly, the intermediate element is attached at each of the opposing rail ends of the contact line rails to be connected together, and the cover elements are attached to the intermediate elements.

20 Claims, 5 Drawing Sheets

U.S. PATENT DOCUMENTS

| | | | |
|---|---|---|---|
| 6,176,711 B1 | 1/2001 | Rohr et al. | |
| 6,229,089 B1 * | 5/2001 | Kohlenberg et al. | 174/70 B |
| 6,517,363 B2 * | 2/2003 | Ross | 439/115 |
| 7,744,386 B1 * | 6/2010 | Speidel et al. | 439/118 |
| 2012/0115341 A1 * | 5/2012 | Lindenau et al. | 439/121 |

OTHER PUBLICATIONS

English translation of International Preliminary Report on Patentability from corresponding PCT Application No. PCT/EP2010/060309, dated Feb. 7, 2012.

* cited by examiner

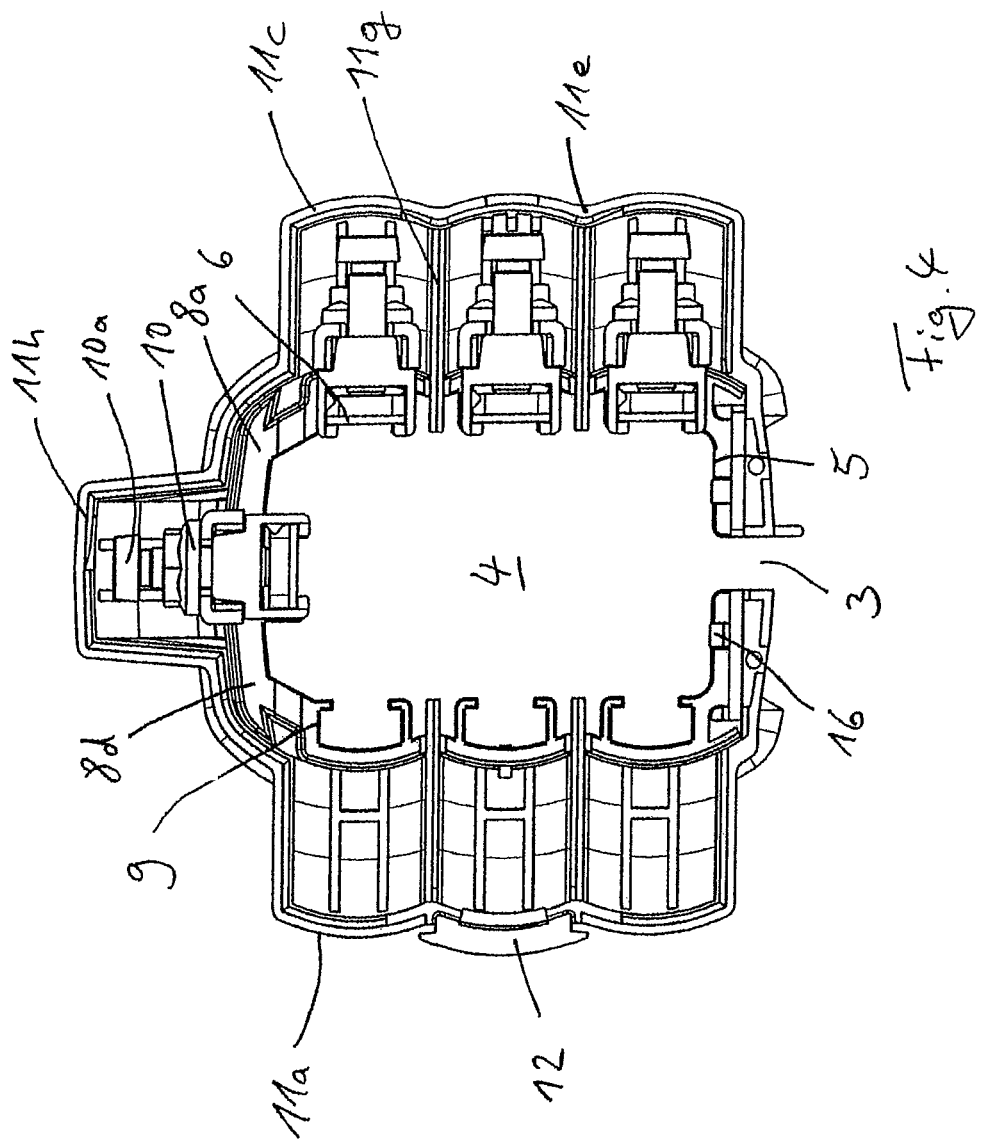

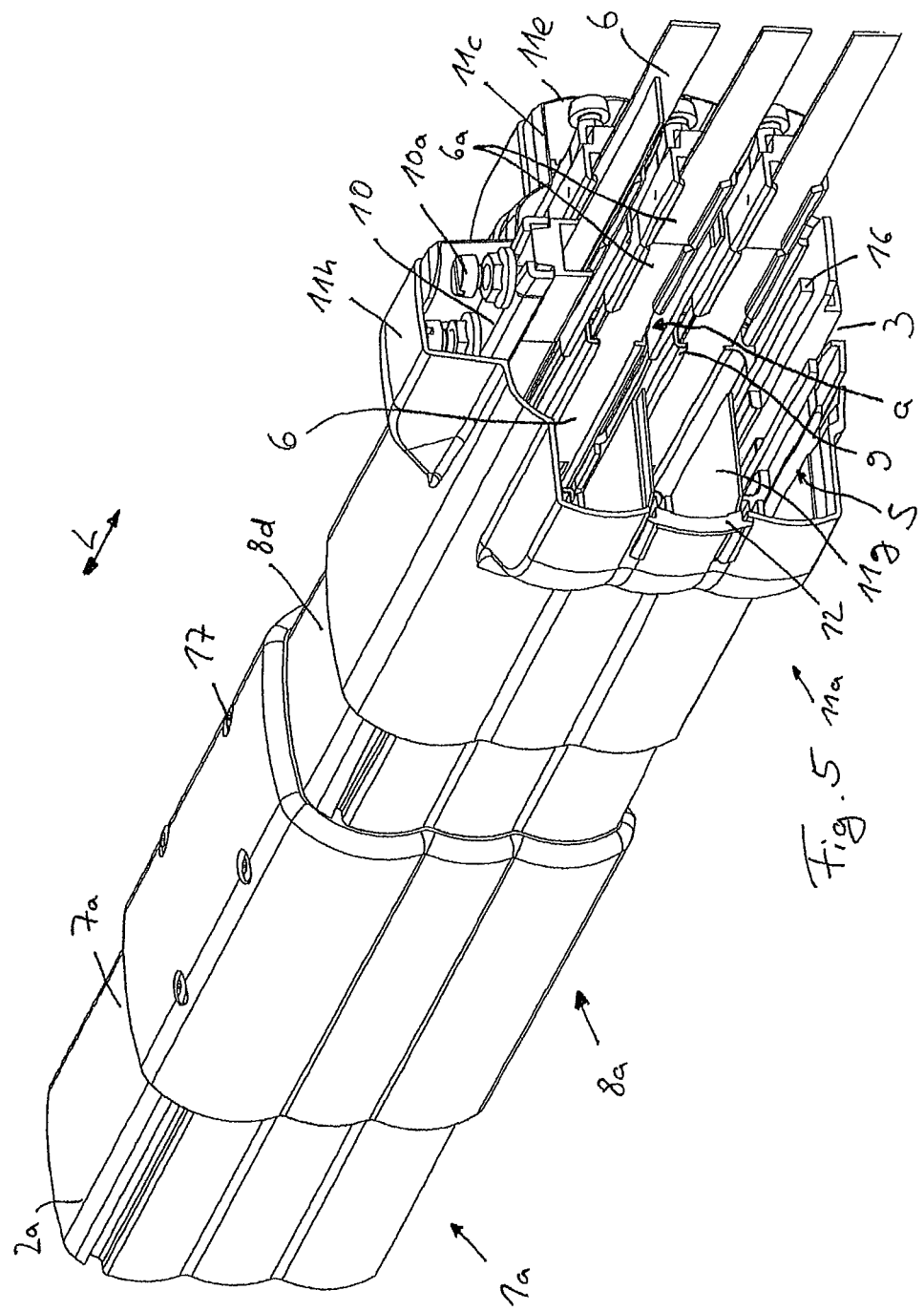

ARRANGEMENT FOR CONNECTING TWO SUCCESSIVE CONTACT LINE RAILS

FIELD OF THE INVENTION

The invention relates to an arrangement for connecting two successive contact line rails which each consist of a longitudinal plastics profile and at least one contact rail extending therealong.

BACKGROUND OF THE INVENTION

It is generally known to use contact lines alongside trailing cables if movable electric consumers—such as, for example, crane travelling trolleys having an electric travelling drive and an electric lift drive—have to be supplied with electric energy. Other areas of application are current supplies for cranes, monorail systems and feeding and processing machines.

German patent DE 198 07 792 C2 discloses a connector for two successive contact lines. Contact lines of this type consist substantially of a longitudinal plastics profile which is formed as a hollow profile having a c-shaped cross-section and an inner space produced therefrom. By reason of the c-shaped cross-section, the longitudinal plastics profile includes a longitudinal gap which extends in the longitudinal direction of the longitudinal plastics profile. Typically, the longitudinal plastics profile is suspended in such a manner that the longitudinal gap faces downwards and the longitudinal plastics profile is thus open at the bottom. Disposed in the inner space of the longitudinal plastics profile are holding elements which extend in the longitudinal direction of the longitudinal plastics profile and into which contact lines consisting of copper are fed. The movable electric consumers are supplied with current or control signals via the contact rails. For this purpose, a current collector trolley in the inner space of the longitudinal plastics profile is movable in and opposite to the longitudinal direction of the longitudinal plastics profile via rollers on tracks in the inner space of the longitudinal plastics profile. Disposed on the current collector trolleys are, on the one hand, contact line contacts and on the other hand, an electric line which is guided outwards to the electric consumer via the longitudinal gap. The contact line contacts are in contact in each case with one of the contact rails in a resiliently pretensioned manner.

In order to connect the ends of two contact lines, the ends of the contact rails protruding out of the ends of the longitudinal plastics profiles are initially connected together via contact rail connectors. In this case, a transverse gap remains between the ends of the longitudinal plastics profiles, in order to be able to equalise the mutually different thermal expansions of the contact rails and the longitudinal plastics profiles. Then, a connector is used which is divided transversely into two housing halves and which essentially has the task of providing protection against contact in relation to the contact rail connectors, permitting any different thermal expansions of the contact rails and the longitudinal plastics profiles and bridging a gap between the ends of the longitudinal plastics profiles in the region of the tracks for the current collector trolleys. The housing halves of the connector are slid onto the opposite ends of the plastics profiles which are to be connected, then the contact rails are connected via the contact rail connectors and subsequently the two housing halves are pushed towards each other, until they are connected together via latching connections and reliably bridge the contact rail connectors. The mutually connected housing halves remain displaceable relative to the two connected plastics profiles within specified limits, in order to be able to equalise any thermal changes in length of the plastics profiles. In order to ensure that the connector is able to fulfill its aforementioned objectives, slots, long holes, recesses and protrusions are provided at the ends of the plastics rails. The long holes serve to attach the housing halves of the connector to the plastics profiles in such a manner as to be displaceable relative to the two connected plastics profiles within specified limits. The recesses and protrusions cover the transverse gap in the region of the track between the two plastics profiles. The slots serve to electrically insulate the holding parts of the mutually adjacent contact rail connectors.

Furthermore, U.S. Pat. No. 2,961,499 discloses a further arrangement for connecting contact line rails. The contact line rails consist substantially of several contact rails which extend in parallel with each other and which are disposed in a sheet metal cover rail which is open at the bottom. In order to connect the ends of the contact rails electrically to each other, contact rail connectors are provided which are attached in a clamping manner to the ends of the contact rails and in the centre of which there is disposed a flexible region which is formed as a flexible wire. The cover rail, as seen in the longitudinal direction thereof, consists of individual portions which are screwed together via u-shaped connection elements. For this purpose, each of the connection elements has approximately the contour of the cover rail, can be inserted in the region of one end into the cover rail until this portion of the cover rail can be screwed to the connection rail and a sufficient length of the connection element protrudes out of the cover rail, in order to attach the subsequent portion of the cover rail and screw it fixedly thereto. A shorter portion of the cover rail can also be disposed in the region of the contact rail connector and can thus assume the function of a cover in the region of the contact rail connector.

SUMMARY OF THE INVENTION

The present invention provides an arrangement for connecting two successive contact line rails, which is simple to produce and permits uncomplicated assembly.

According to one aspect of the invention, an arrangement is provided for connecting two successive contact line rails, which each include a longitudinal plastics profile and at least one contact rail extending therealong. A contact rail connector connects the opposite contact rail ends of the contact rails of two successive contact line rails and electrically and mechanically connects the contact rail ends of the contact rails. Additional cover elements are attached to the opposite rail ends of the contact line rails of two successive contact line rails, cover the contact rail connectors, and are displaceable relative to the intermediate element in the longitudinal direction thereof. Simplified production of the contact line rails and uncomplicated assembly thereof may be achieved by attaching an intermediate element to each of the opposite rail ends of the contact line rails to be connected, and attaching the additional cover elements to the intermediate elements. As a consequence, the contact line rails can be cut to length in a convenient manner on site, i.e., transversely with respect to the longitudinal extension of the contact line rails, and the attachable intermediate elements then provide the required configuration for receiving the additional cover elements. The contact line rails are thus constructed in the manner of a modular system, and include the longitudinal plastics profile, the intermediate element and the additional cover element. It is thus not necessary to acquire and operate computer-controlled milling machines for machining the ends of the longitudinal plastics profile. Moreover, the milled portions do not have to be produced in a factory. The longitudinal plastics profile can simply be cut to specific lengths on site. The intermediate element thus provides the function of an adapter between the contact line rail and the additional cover element. Since substantially only the contact rail connector electrically and mechanically connects the opposite contact rail ends of the contact rails, it is possible to equalise the different thermal expansion coefficients of the contact rails, which may be made of copper, for example, and the longitudinal plastics profiles, which may be made of polyvinyl chloride (PVC), whose respective thermal expansion coefficients may deviate from each other by a factor of 9 to 12.

The intermediate elements can be assembled in a simple manner, such as when each intermediate element is formed in the manner of a sleeve, whereby the intermediate elements may be slid onto the rail end of the contact line rail and attached to the rail end of the contact line rail via fastening elements.

Because each intermediate element includes an attachment portion and a rail portion which adjoins it, the rail portion has a cross-section corresponding to the longitudinal plastics profile of the contact line rails, and disposed in the rail portion are long holes which are aligned in the longitudinal direction of the intermediate element and into which protrusions (disposed on the inner side of the additional cover element) engage in such a manner that the additional cover element is held on the intermediate element, it is possible to limit or prevent costly machining of the contact rail ends.

Costly machining of the contact rail ends can further be reduced by forming slots in the rail portion that are aligned in the longitudinal direction of the intermediate element and are open with respect to the beginning of the rail portion opposite the attachment portion, and partition walls which are disposed on the additional cover element are inserted into the slots for electrically insulating the contact rail connectors from each other.

In constructional terms, the additional cover elements and the intermediate elements of the plastics profile rails may each have a c-shaped cross-section having an inner space and a longitudinal gap, which extends in the longitudinal direction thereof, and include or define tracks for a current collector trolley that extend on both sides adjacent to the longitudinal gap.

Costly machining of the contact rail ends can be further reduced by forming track slots that are aligned in the longitudinal direction of the intermediate element in the region of the tracks, and disposed in the rail portion, and defining a gap between the opposite beginnings or end portions of the intermediate elements, which are connected together via the contact rail connectors, this gap being bridged by track webs that are disposed in the inner space of the additional cover elements, wherein the track webs protrude into the track slots.

Optionally, the additional cover elements, as seen in the longitudinal direction of the plastics profile rail, have transversely extending and opposite-lying bearing surfaces which are connected together via a latching connection.

Production of the longitudinal plastics profiles, the intermediate elements and the additional cover elements may be facilitated by forming these as injection-moulded plastics parts. Thus, costly milling of the slots, the long holes, and track slots may be omitted.

These and other objects, advantages and features of this invention will become apparent upon review of the following specification in conjunction with the drawings.

BRIEF DESCRIPTION OF THE DRAWINGS

FIG. 4 is a front elevation of the contact line rail and cover element of FIG. 3; and FIG. 5 is a perspective view of the contact line rail, intermediate element, and cover element of FIG. 3, shown with contact rails of an adjoining contact line rail and with portions removed for clarity.

DESCRIPTION OF THE PREFERRED EMBODIMENTS

Figure 1:
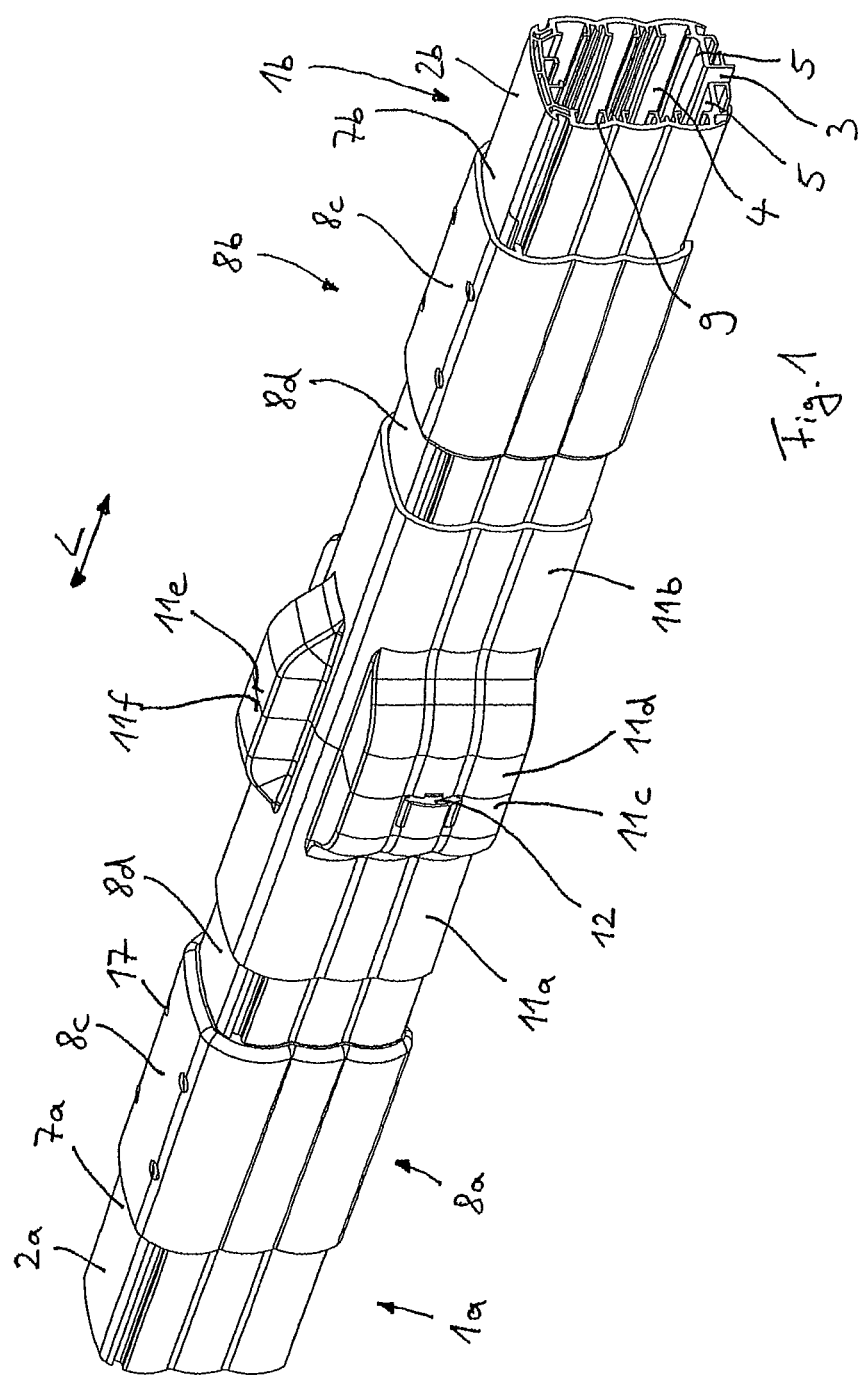
FIG. 1 is a perspective view of an arrangement for connecting two successive contact line rails in accordance with the present invention.

Referring now to the drawings and the illustrative embodiments depicted therein, an arrangement for connecting a first contact line rail 1a to a second contact line rail 1b, such contact line rails 1a, 1b typically being used if movable electric consumers such as, for example, a crane travelling trolley with an electric travelling drive and an electric lift drive, has to be supplied with electric energy.

The first and second contact line rails 1a, 1b each include a first longitudinal plastics profile 2a and a second longitudinal plastics profile 2b. The longitudinal plastics profiles 2a, 2b are formed as hollow extruded profiles and form a c-shaped cross-section having a longitudinal gap 3, which extends in the longitudinal direction L of the longitudinal plastics profiles 2a, 2b, and an inner space 4. Typically, the longitudinal plastics profiles 2a, 2b are suspended for operation such that the longitudinal gap 3 faces downwards and the tracks 5 adjacent to the longitudinal gap 3, on the right and left in the inner space 4, are aligned substantially horizontally. Rolling on the tracks 5 are contact line carriages which, on the one hand, are connected to the movable electric consumer via an electric line and, on the other hand, slide via contact line contacts along contact rails 6 (FIG. 5) which extend in the inner space 4 in the longitudinal direction L of the contact line rails 1a, 1b.

Figure 3:
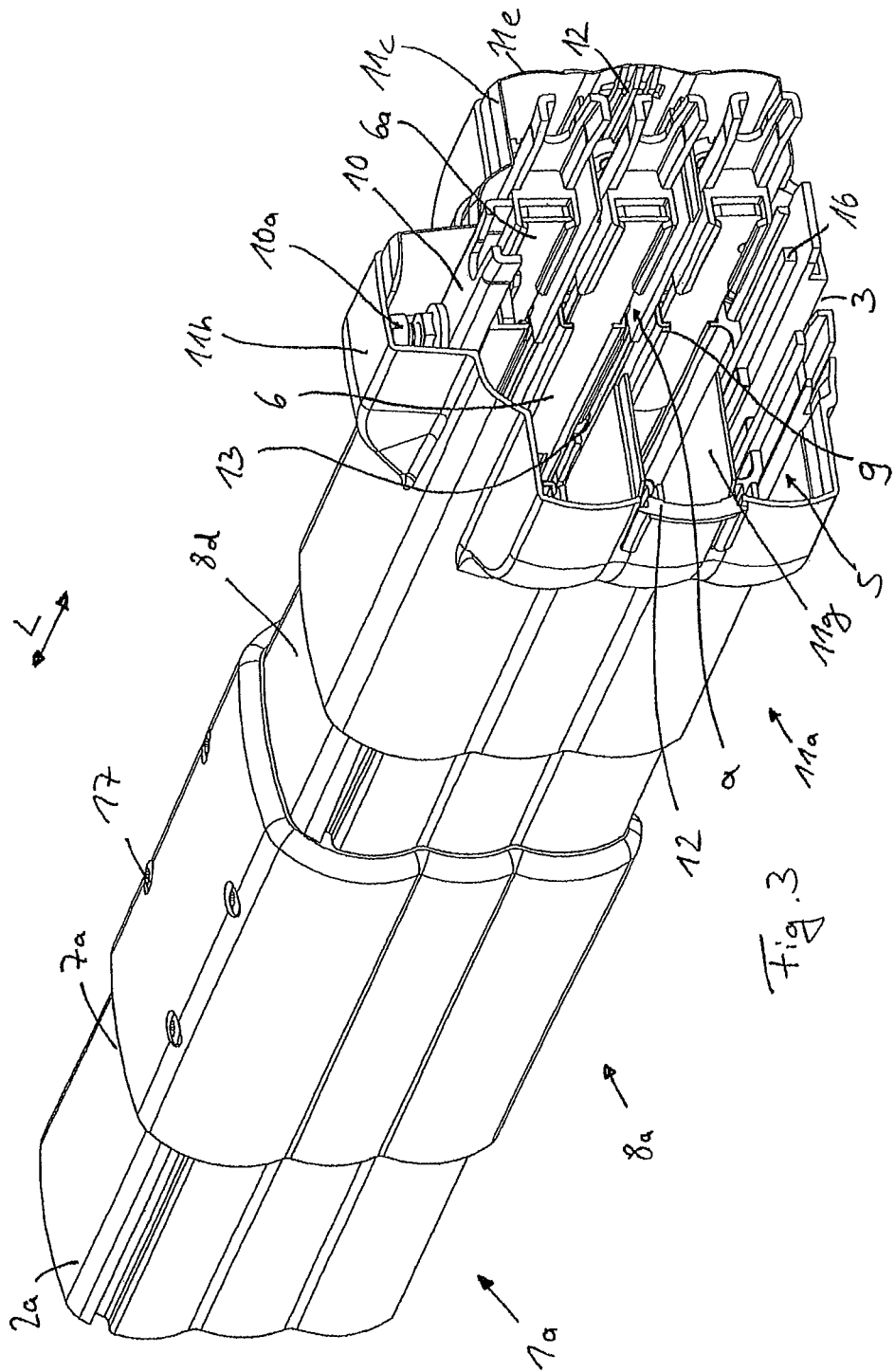
FIG. 3 is a perspective view of the contact line rail and intermediate element of FIG. 2, shown with cover element attached to the intermediate element.

In order to be able to mutually connect the two first and second contact line rails 1a and 1b, which are aligned flush with one another in the longitudinal direction L, a first rail end 7a of the first contact line rail 1a is connected to a first intermediate element 8a, and a second rail end 7b of the second contact line rail 1b is connected to a second intermediate element 8b. Each of the first and second intermediate elements 8a and 8b includes, as seen in the longitudinal direction L, of an attachment portion 8c and a rail portion 8d adjoining it. The attachment portion 8c includes an inner contour which is formed in such a manner that it corresponds to the outer contour of the contact line rail 1a, 1b and can thus be slid on in a positive-locking manner in the longitudinal direction L of the contact line rails 1a and 1b. In contrast thereto, the rail portion 8d includes an outer contour, an inner contour and a cross-sectional shape which corresponds to the rail ends 7a, 7b of the contact line rails 1a, 1b. In the course of connecting the contact line rails 1a and 1b to each other, the contact rails 6 are then inserted into the holders 9, which are provided in the inner space 4 in the desired number in the longitudinal direction L, so that the contact rails 6 protrude slightly from the rail portions 8d of the intermediate elements 8a, 8b, and are accordingly cut to length as required. The first contact rail end 6a and the second contact rail end 6b of the first and second contact line rails 1a, 1b are connected together via a contact rail connector 10. In this case, a gap S remains between the opposite beginnings 6e of the attachment portions 8c (FIG. 3). Therefore, the first and second contact line rails 1a, 1b are connected mechanically and electrically via the contact rail connectors 10 and the associated contact rails 6. As a result, it is possible to equalise the different thermal expansion coefficients of the contact rails 6, which may be of copper, and the longitudinal plastics profiles 2a, 2b, which may be of polyvinyl chloride (PVC), which deviate from one another in their respective thermal expansion coefficients by a factor of 9 to 12.

In order to cover the contact rail connectors 10 in terms of protection against contact prior to assembly of the contact rail connectors 10, a first additional cover element 11a is slid onto the rail portion 8d of the first intermediate element 8a, and a second additional cover element 11b is slid onto the rail portion 8d of the second intermediate element 8a in an assembled position. These additional cover elements 11a, 11b include or define an inner contour which is adapted to the outer contour of the rail portion 8d of the intermediate elements 8a, 8b in such a manner that the additional cover elements 11a, 11b can be displaced in the longitudinal direction L on the rail portions 8d of the intermediate elements 8a, 8b. After the contact line rails 1a, 1b have been connected together via the contact rail connectors 10, the first additional cover element 11a and the second additional cover element 11b are pushed towards each other in the longitudinal direction L to an operating position, until they lie flush against each other with their opposite first additional cover element end 11c and the second additional cover element end 11d. The additional cover element ends 11c, 11d include first bearing surfaces 11e and second bearing surfaces 11f which are aligned transversely with respect to the longitudinal direction L. In the operating position, in which the first bearing surface 11e and the second bearing surface 11f lie against each other, the first and second additional cover elements 11a, 11b are held in the operating position via latching connections 12.

Figure 2:
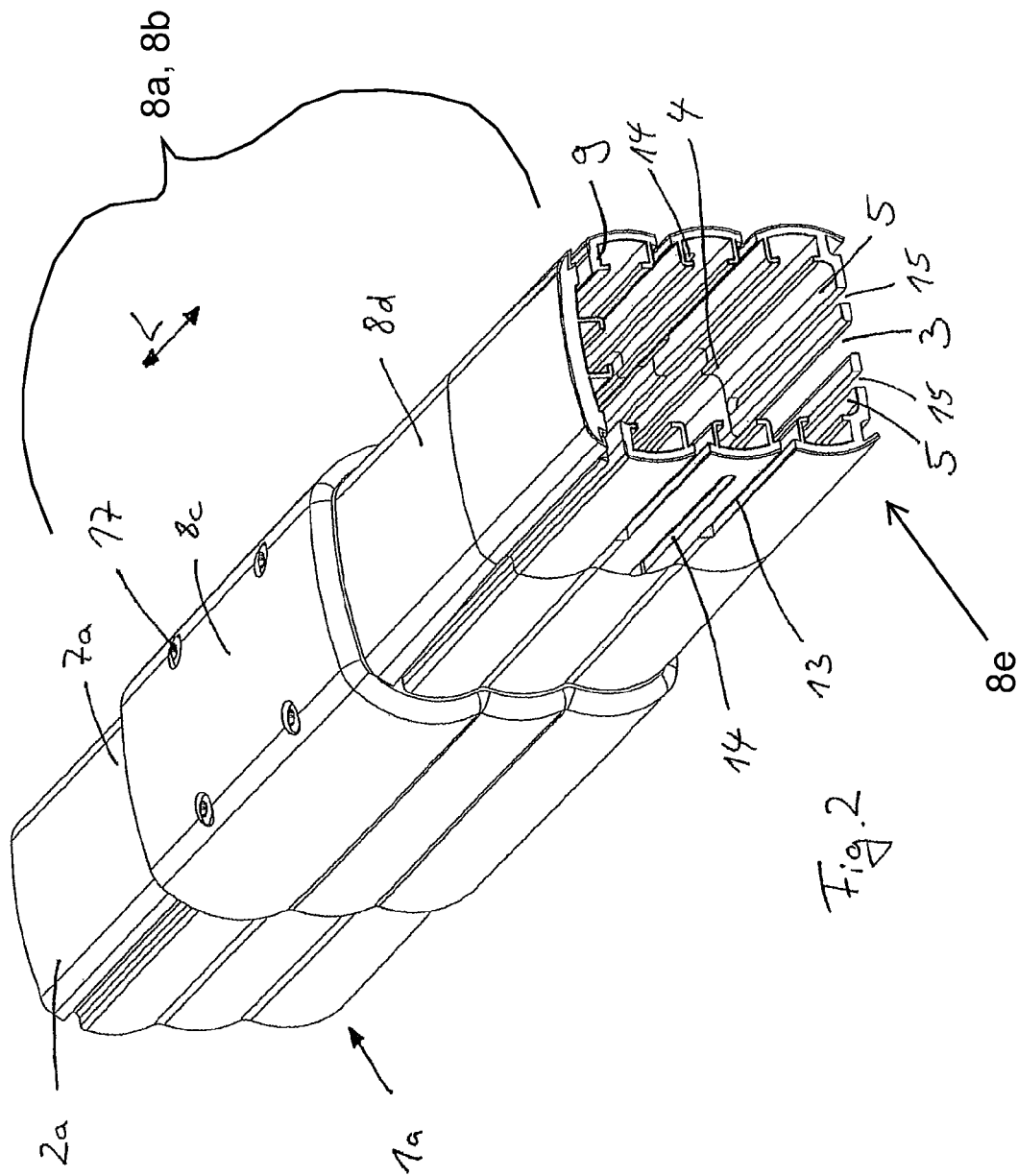
FIG. 2 is a perspective view of one end of a contact line rail with an intermediate element attached thereto, from the arrangement of FIG. 1.

Referring now to FIG. 2, the first additional cover element 11a is not yet mounted, so that the detailed structure of the end of the attachment portion 8c of the first intermediate element 8a is visible. The attachment portion 8c of the second intermediate element 8b is formed in a corresponding manner. The rail portion 8d defines an inner space 4 which corresponds to the inner space 4 of the contact line rails 1a, 1b. In particular, c-shaped holders 9, which are open in the direction of the inner space 4 and protrude inwardly, can be seen on the lateral walls and the upper wall. Three holders 9 are disposed on the opposite lateral walls of the inner space 4 and a further holder is disposed on the upper wall of the inner space 4. The holders 9 each have a substantially c-shaped and rectangular cross-section and serve to receive the flat profile-shaped contact rails 6, which are inserted in the longitudinal direction L into the holders 9 and are held thereby in a positive-locking manner by virtue of the c-shaped configuration. Three holders 9 are disposed one on top of the other on the lateral walls of the inner space 4. Disposed between the first and second holders 9 and the second and third holders 9 are slots 13, which in each case are aligned in the longitudinal direction L and which, starting from the beginning 8e of the rail portion 8d, protrude into the rail portion 8d approximately one third of the length of the rail portion 8d. These slots 13 serve to receive a partition wall 11g of the additional cover elements 11a, 11b which is aligned substantially horizontally and electrically insulates the contact rail connectors 10 from each other. A further long hole 14, which likewise extends in the longitudinal direction L of the rail portion 8d, is provided in the sidewall of the rail portion 8d between the slots 13. An inwardly protruding protrusion of the additional cover elements 11a, 11b engages in a positive-locking manner into this long hole 14—also provided on the opposite side of the rail portion 8d—and thus renders it possible to attach the additional cover elements 11a, 11b to the rail portion 8d in a captive manner and at the same time to hold them in such a manner as to be displaceable in the longitudinal direction L, in order to be able to push them towards one another during subsequent connection of the contact line rails 1a, 1b and covering of the contact rail connectors 10 by means of the additional cover elements 11a, 11b.

Furthermore, in the region of the tracks 5, which are adjacent to the longitudinal gap 3, track slots 15 run centrally in the region of the track 5 and likewise extend in the longitudinal direction L (FIG. 2). As previously described, since in the mutually connected operating state of the contact line rails 1a, 1b a gap S remains between the opposite ends of the intermediate elements 8a and 8b, the width of the gap corresponding approximately to the length of the contact rail connectors 10, and this gap S between the tracks 5 may be bridged by the additional cover element 11. For this purpose, the additional cover element 11 also includes a track portion that is formed in the manner of a track web 16 which, in the operating state of the additional cover elements 11a, 11b, protrudes into the track slots 15 of the opposite rail portions 8d.

The intermediate element 8a, which is slid with its attachment portion 8c onto the longitudinal plastics profile 2a, is attached to the longitudinal plastics profile 2a via fastening elements 17 in the form of screws (FIG. 2). The fastening elements 17 clamp the additional cover element 11a, 11b on the attachment portion 8c.

The first rail end 7a of the first contact line rail 1a receives first intermediate element 8a, wherein in addition the first additional cover element 11a is attached for the purpose of covering the contact rail connectors 10 (FIG. 3). In this view, contact rails 6 are already inserted in some of the holders 9 and their first contact rail ends 6a protrude from the holders 9 of the attachment portion of the first intermediate element 8a. The contact rail connectors 10 are already slid onto these first contact rail ends 6a and screwed thereto. It is evident that a spaced interval 'a' remains between the contact rail connectors 10 and the beginning 8e of the rail portion 8d.

It is also evident that the first additional cover element 11a includes, in the region of its first additional cover element end 11c, outwardly directed convex portions 11h for covering the contact rail connectors 10, in particular the clamping screw 10a thereof. The second additional cover element 11b is formed in a corresponding manner.

In the region of the tracks 5, the track webs 16 protrude into the track slots 15 in the longitudinal direction L thereof (FIG. 3). The partition walls 11e of the first additional cover element 11a protrude inwardly, are aligned horizontally and, in the operating state of the first additional cover element 11a, insulate the contact rail connectors 10 of contact rails 6, which are disposed adjacent to each other and one on top of the other, mechanically and electrically from each other. In this case, the partition walls 11g protrude into the slots 13 of the rail portion 8d of the first intermediate element 8a. The same applies to the second additional cover element 11b.

Referring now to FIG. 4, and in particular the right-hand portion thereof, the horizontally aligned partition walls 11g of the first additional cover element 11a are shown to separate the contact rail connectors 10, which are disposed one on top of the other, electrically and mechanically from each other.

As best shown in FIG. 5, contact rails 6 are inserted into the contact rail connectors 10 where they are attached. A gap S remains between the beginnings 8e of the rail portion 8d of the first and second intermediate elements 8a and 8b the gap S being bridged only by the contact rails 6 and the contact rail connectors 10, and by the first and second additional cover elements 11a, 11b.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. An arrangement of connected successive contact line rails, said arrangement comprising;
    at least two contact line rails, each having a longitudinal plastics profile with opposite ends and at least one contact rail extending therealong and having contact rail ends;
    at least one contact rail connector configured to connect opposite ones of the contact rail ends of the contact rails of the at least two contact line rails in successive arrangement, and the contact rail connectors further configured to electrically and mechanically connect the contact rail ends of the contact rails;
    cover elements attached to the opposite rail ends of the contact line rails of two successive contact line rails and configured to cover the contact rail connectors;
    an intermediate element that is attachable to the opposite contact line rail ends of the successive contact line rails to be connected; and
    wherein the cover elements are attached to the intermediate elements and are displaceable relative to the intermediate elements in a longitudinal direction thereof.

2. The arrangement as claimed in claim 1, wherein each intermediate element is formed in the manner of a sleeve, is slid onto the rail end of the contact line rail and is attached to a respective one of the opposite ends of the contact line rail via fastening elements.

3. The arrangement as claimed in claim 1, wherein each intermediate element comprises an attachment portion and an adjoining rail portion, the rail portion having a cross-section corresponding to the longitudinal plastics profile of the contact line rails, with long holes disposed in the rail portion and aligned in a longitudinal direction of the intermediate element, and wherein the cover element comprises protrusions disposed on an inner side thereof, the protrusions engaging respective ones of the long holes in the rail portion in such a manner that the cover element is held on the intermediate element.

4. The arrangement as claimed in claim 3, further comprising slots disposed in the rail portion and aligned in the longitudinal direction of the intermediate element, wherein the slots are open with respect to an end of the rail portion opposite the attachment portion of the intermediate element, and wherein partition walls that are disposed on the cover element are inserted into the slots for electrically insulating the contact rail connectors from each other.

5. The arrangement as claimed in claim 3, wherein the plastics profile rails, the cover elements, and the intermediate elements each have a c-shaped cross-section defining an inner space and a longitudinal gap, which extends in the longitudinal direction thereof, and the arrangement further defining tracks for a current collector trolley, the tracks extending on both sides adjacent to the longitudinal gap.

6. The arrangement as claimed in claim 5, further comprising:
    track slots disposed in the rail portion of the intermediate element and aligned in the longitudinal direction of the intermediate element in the region of the tracks;
    a gap defined between the opposite ends of the intermediate elements, which are connected together via the contact rail connectors; and
    track web disposed in the inner space of the additional elements and bridging the gap between the intermediate elements, wherein the track webs protrude into the track slots.

7. The arrangement as claimed in claim 1, wherein the cover elements, as seen in the longitudinal direction of the plastics profile rail, have transversely extending and opposite-lying bearing surfaces which are connected together via a latching connection.

8. The arrangement as claimed in claim 1, wherein the longitudinal plastics profiles, the intermediate elements and the cover elements comprise injection-moulded plastics parts.

9. The arrangement as claimed in claim 2, wherein each intermediate element comprises an attachment portion and an adjoining rail portion, the rail portion having a cross-section corresponding to the longitudinal plastics profile of the contact line rails, with long holes disposed in the rail portion and aligned in a longitudinal direction of the intermediate element, and wherein the cover element comprises protrusions disposed on an inner side thereof, the protrusions engaging respective ones of the long holes in the rail portion in such a manner that the cover element is held on the intermediate element.

10. The arrangement as claimed in claim 9, further comprising slots disposed in the rail portion and aligned in the longitudinal direction of the intermediate element, wherein the slots are open with respect to an end of the rail portion opposite the attachment portion of the intermediate element, and wherein partition walls that are disposed on the cover element are inserted into the slots for electrically insulating the contact rail connectors from each other.

11. The arrangement as claimed in claim 10, wherein the plastics profile rails, the cover elements, and the intermediate elements each have a c-shaped cross-section defining an inner space and a longitudinal gap, which extends in the longitudinal direction thereof, and the arrangement further defining tracks for a current collector trolley, the tracks extending on both sides adjacent to the longitudinal gap.

12. The arrangement as claimed in claim 11, further comprising:
    track slots disposed in the rail portion of the intermediate element and aligned in the longitudinal direction of the intermediate element in the region of the tracks;
    a gap defined between the opposite ends of the intermediate elements, which are connected together via the contact rail connectors; and
    track webs disposed in the inner space of the additional elements and bridging the gap between the intermediate elements, wherein the track webs protrude into the track slots.

13. The arrangement as claimed in claim 12, wherein the cover elements, as seen in the longitudinal direction of the plastics profile rail, have transversely extending and opposite-lying bearing surfaces which are connected together via a latching connection.

14. The arrangement as claimed in claim 13, wherein the longitudinal plastics profiles, the intermediate elements and the cover elements comprise injection-moulded plastics parts.

15. The arrangement as claimed in claim 4, wherein the plastics profile rails, the cover elements, and the intermediate elements each have a c-shaped cross-section defining an inner space and a longitudinal gap, which extends in the longitudinal direction thereof, and the arrangement further defining tracks for a current collector trolley, the tracks extending on both sides adjacent to the longitudinal gap.

16. The arrangement as claimed in claim 15, further comprising:
   track slots disposed in the rail portion of the intermediate element and aligned in the longitudinal direction of the intermediate element in the region of the tracks;
   a gap defined between the opposite ends of the intermediate elements, which are connected together via the contact rail connectors; and
   track webs disposed in the inner space of the additional elements and bridging the gap between the intermediate elements, wherein the track webs protrude into the track slots.

17. The arrangement as claimed in claim 16, wherein the cover elements, as seen in the longitudinal direction of the plastics profile rail, have transversely extending and opposite-lying bearing surfaces which are connected together via a latching connection.

18. The arrangement as claimed in claim 17, wherein the longitudinal plastics profiles, the intermediate elements and the cover elements comprise injection-moulded plastics parts.

19. The arrangement as claimed in claim 1, wherein the plastics profile rails, the cover elements, and the intermediate elements each have a c-shaped cross-section defining an inner space and a longitudinal gap, which extends in the longitudinal direction thereof, and the arrangement further defining tracks for a current collector trolley, the tracks extending on both sides adjacent to the longitudinal gap.

20. The arrangement as claimed in claim 2, wherein the plastics profile rails, the cover elements, and the intermediate elements each have a c-shaped cross-section defining an inner space and a longitudinal gap, which extends in the longitudinal direction thereof, and the arrangement further defining tracks for a current collector trolley, the tracks extending on both sides adjacent to the longitudinal gap.

\* \* \* \* \*